United States Patent
Shintani

(10) Patent No.: US 9,948,982 B2
(45) Date of Patent: Apr. 17, 2018

(54) LOCALITY SYSTEMS AND METHODS FOR DIGITAL BROADCASTING

(71) Applicant: SONY CORPORATION, Tokyo (JP)

(72) Inventor: Peter Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/202,197

(22) Filed: Jul. 5, 2016

(65) Prior Publication Data

US 2018/0014070 A1   Jan. 11, 2018

(51) Int. Cl.
    *H04N 7/16*     (2011.01)
    *H04N 21/45*     (2011.01)
    *H04W 4/00*     (2018.01)

(52) U.S. Cl.
CPC ........ *H04N 21/4524* (2013.01); *H04W 4/008* (2013.01)

(58) Field of Classification Search
CPC ................. H04N 21/4383; H04N 21/4524
See application file for complete search history.

(56) References Cited

U.S. PATENT DOCUMENTS

| | | | |
|---|---|---|---|
| 6,952,182 B2 | 10/2005 | Spilker, Jr. | |
| 8,149,168 B1 | 4/2012 | Rabinowitz | |
| 8,436,947 B2 | 5/2013 | Barry | |
| 2007/0143788 A1* | 6/2007 | Abernethy, Jr. | ........ H04H 60/51 725/35 |
| 2008/0055156 A1 | 3/2008 | Banerjee | |
| 2009/0300773 A1* | 12/2009 | Pal | .......... H04H 60/31 726/27 |
| 2011/0187599 A1* | 8/2011 | Graybeal | .............. G01S 5/0036 342/458 |
| 2012/0209706 A1 | 8/2012 | Ramer | |
| 2013/0163382 A1* | 6/2013 | Millar | ..................... G01S 13/46 367/127 |
| 2016/0182940 A1* | 6/2016 | Assayag | ............ H04N 21/4312 725/62 |
| 2016/0337685 A1* | 11/2016 | James | ..................... H04H 60/42 |
| 2017/0052965 A1* | 2/2017 | Tiwari | .............. G06F 17/30241 |

\* cited by examiner

*Primary Examiner* — Gigi L Dubasky
(74) *Attorney, Agent, or Firm* — Fitch, Even, Tabin & Flannery LLP

(57) ABSTRACT

Systems and methods for determining location of a digital broadcast receiver. The system includes the digital broadcast receiver receiving digital broadcasting, and at least one computing device configured to determine a location of the device. In one embodiment the receiver communicates with the at least one nearby location-enabled device and receives a device location. In one embodiment the system uses acoustic pings to determine the proximity of the device to the receiver.

17 Claims, 5 Drawing Sheets

LOCALITY SYSTEMS AND METHODS FOR DIGITAL BROADCASTING

BACKGROUND OF THE INVENTION

1. Field of the Invention

The present invention relates generally to television broadcasting and more specifically to digital television broadcasting.

2. Discussion of the Related Art

Digital television is the transmission of audio and video by digitally processed and multiplexed signal. Several different digital television broadcasting standards have been developed, including the Advanced Television System Committee (ASTC) standard currently adopted by six countries including the United States. ASTC uses eight-level vestigial sideband (8-VSB) for terrestrial broadcasting.

Currently, each ASTC digital television channel in North America is permitted to be broadcast over a single 6 MHz channel at a maximum bit rate of about 19 megabits per second. This available broadcast bandwidth may include PSIP (Program and System Information Protocol) and can also subdivide across multiple video subchannels (feeds), including non-video datacasting services that allow one-way high bit-rate streaming of data to computers. Future ATSC standards are slated to accommodate non-real-time broadcasting, i.e. broadcasting that is received by the television and stored for playback at a later time.

Advertising is an integral part of terrestrial television broadcasting. Additionally, location-based advertising is becoming increasingly desirable as platforms increasingly diversify. The ability to target advertising based on location of the playback device is becoming increasingly important, thus the need to determine a location for digital broadcast receivers so that the receivers can receive targeted advertisements based on location.

One way for the television's location to be determined is for a GPS receiver to be installed in the receiver. However, this induces extra cost and complexity to the system. Another method, as outlined in U.S. Pat. No. 6,952,182, uses scattered pilot signals of an ISDB-T signal from multiple nearby digital television transmitters to determine the approximate distance between the digital television and each transmitter. The location of the television can then be determined.

SUMMARY OF THE INVENTION

Several embodiments of the invention advantageously address the needs above as well as other needs by providing a digital broadcast receiver comprising: a tuner front-end configured to receive digital broadcasting; a processor; a non-transitory memory coupled to the processor; a short-range communication module configured to perform short-range communication; and a receiver location application configured to run on the processor and communicatively coupled with the short-range communication module, the digital broadcast receiver configured to perform the steps of: finding, via the short-range communication module, at least one location-enabled device within range of the short-range communication; selecting one of the at least one location-enabled device within range of the short-range communication; establishing short-range communication with the selected location-enabled device; and receiving geographical location data from the selected location-enabled device, whereby the location data is used by the digital broadcast receiver as the location of the digital broadcast receiver.

In another embodiment, the invention can be characterized as a method for determining a geographic location of a digital broadcast receiver configured to receive and process digital broadcast signals and configured for short-range communication, comprising the steps of: finding at least one location-enabled device within range of the short-range communication; selecting one of the at least one location-enabled device within range of the short-range communication; establishing short-range communication with the selected location-enabled device; and receiving geographical location data from the selected location-enabled device, whereby the location data is used by the digital broadcast receiver as the location of the digital broadcast receiver.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
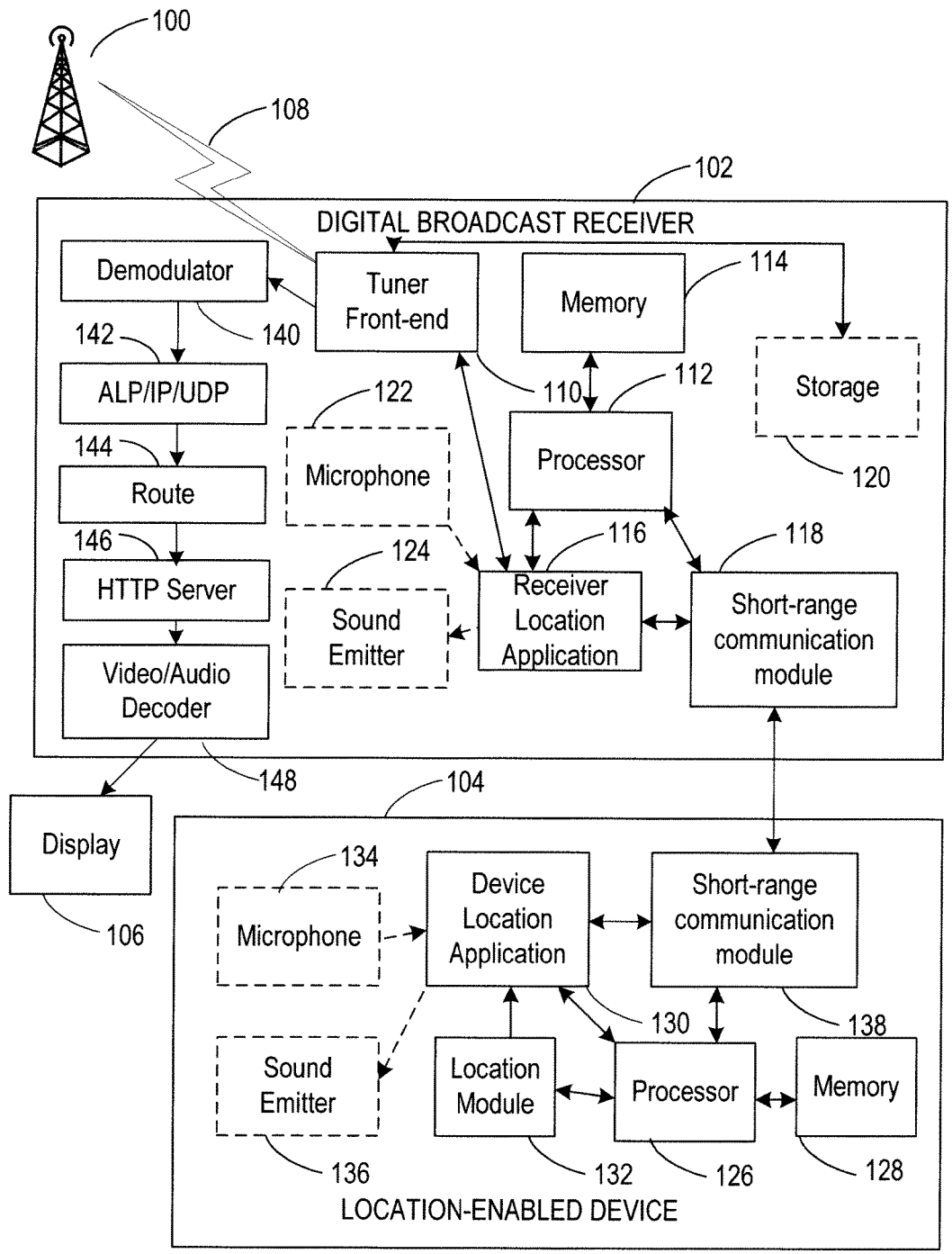
FIG. 1 is schematic diagram of a television broadcast receiver locality system in a first embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring first to FIG. 1, a television broadcast receiver locality system is shown in a first embodiment of the present invention. Shown are a digital broadcast source 100, a digital broadcast receiver 102, a location-enabled device 104, a display 106, and a digital broadcast signal 108. The digital broadcast receiver 102 includes a tuner front-end 110, a receiver processor 112, a receiver non-transitory memory 114, a receiver location application 116, a receiver short-range communication module 118, a storage 120, and optional receiver microphone 122, and an optional receiver sound emitter 124. The location-enabled device 104 includes a device processor 126, a device non-transitory memory 128, a device location application 130, a location module 132, an optional device microphone 134, an optional device sound emitter 136, a device short-range communication module 138, a demodulator 140, an ALP/IP/UDP module, a route module 144, an HTTP server 146, and an audio/video decoder 148.

The digital broadcast receiver 102 is configured to receive on-air digital television broadcast signals 108 via a tuner included in the tuner front-end 110. The tuner is configured to receive a plurality of streams within a single radio frequency (RF) channel, for example, broadcast signals sent in accordance with the ATSC 3.0 standard. In other embodiments the receiver 102 is configured to receive signals based on other RF broadcast standards, for example DVB, ARIB, TTA, or any other standard compatible with the systems and methods disclosed herein. The tuner is also configured to receive non-media data included in the broadcast signal 108, such as metadata and timing and content-related information. The tuner front-end 110 also includes additional components as necessary for proper digital broadcast receiver operation, for example a demodulator, a demuxer and a decoder. The tuner front-end 110 is coupled to the receiver processor 112 as required to prepare the received broadcast signal 108 for display on the display 106. The receiver processor 112 is coupled to the receiver non-transitory memory 114.

The tuner front-end 110 is also coupled to the display 106, and typically includes a tuner and a demodulator. In the embodiment shown, the tuner front-end 110 is coupled to the display 106 via the interposed ALP/IP/UDP module 142, the route module 144, the HTTP server module 146, and the video-audio decoder 148. The display 106 may be a discrete display coupled to the receiver 102 as shown in FIG. 1, for example a set-top box receiver coupled to a television. In other embodiments the receiver 102 is integrated with the display 106, for example as a single "smart television" apparatus. The display 106 receives the broadcast output from the tuner front-end 110 (as modified by the interposed components) and presents the audio, video, and/or other received broadcast non-media data on the display 106. It will be understood that the display 106 includes speakers and any other elements necessary to present the received broadcast output.

The receiver 102 also includes the receiver short-range communication module 118 coupled to the receiver processor 112. The receiver short-range communication module 118 includes hardware and software configured to perform at least one type of short-range communication with another device. Examples of short-range communication include, but are not limited to, Bluetooth®, local wireless network communication, or near field communication (NFC).

The receiver short-range communication module 118 is also coupled to the receiver location application 116. The receiver location application 116 runs on the receiver processor 112 is configured to use the receiver short-range communication module 118 to receive data obtained by the receiver short-range communication module 118 from a connected device (in this embodiment, the data is location data). The receiver location application 116 is coupled to the tuner front-end 110 and is configured to communicate with the tuner front-end 110 to determine what broadcast media is displayed based on the location, as described further below in FIG. 2.

The receiver 102 may also include the optional storage 120 configured to store media and/or data received by the tuner and store it for later usage. In some embodiments the receiver 102 includes the receiver microphone 122 and/or the receiver sound emitter 124 for use in the acoustic ping method described below in FIGS. 3-5. The receiver microphone 122 and receiver sound emitter 124 are coupled to the receiver location application 116.

The location-enabled device 104 includes the device processor 126 coupled to the device non-transitory memory 128. The device short-range communication module 138 is coupled to the device processor 126. The device short range communication module is similar to the receiver short-range communication module 118 (including short-range communication hardware and software) and communicates with the receiver short-range communication module 118 over a mutual short-range communication type.

The location-enabled device 104 is configured to determine the approximate geographical location of the location-enabled device 104. The location-enabled device 104 also includes the device location application 130 coupled to and running on the device processor 126. The device location application 130 receives data indicating a geographical location of the location-enabled device 104 via the location module 132. The location module 132 may include any hardware and/or software configured for determining the location of the location-enabled device 104, for example using GPS, cell phone tower locations, or local wireless networks (or a combination of the above) to determine the geographical location of the location-enabled device 104. The location module 132 is coupled to the device processor 126.

The device location application 130 is configured to receive the location data from the location module 132, and send the received location data to the receiver 102 via the device short-range communication module 138.

In some embodiments the location-enabled device 104 may also include the device microphone 134 and/or the device sound emitter 136 for use in the acoustic ping method described below in FIGS. 3-5. The device microphone 134 and device sound emitter 136 are coupled to the device location application 130.

Referring again to FIG. 1, the television broadcast locality system uses at least one nearby location-enabled device 104 to determine the approximate geographical location of the digital broadcast receiver 102. In this disclosure, nearby is defined as being within short-range communication range.

As previously mentioned, presentation of location-specific media to broadcast television viewers is becoming more desirable by advertisers and broadcasters, but digital broadcasting over radio frequencies is one-way communication: the broadcaster has no way of determining the geographical locations of the broadcast receivers, other than that the receivers are within the large broadcast area. Therefore, systems and methods are needed to determine the geographical location of each receiver within the large broadcast area with a greater degree of accuracy.

With the current bandwidth size of digital broadcast channels now available, and which is set to increase with the adaptation of the ATSC 3.0 standard, multiple digital streams may be broadcast within each single broadcast channel signal. For example, multiple streams of advertisements may be simultaneously broadcast over one channel. The advertisement streams could each include a location indication indicating for which geographical area each stream is to be presented to the viewer.

The receiver 102 then determines the receiver location in order to determine the advertisement stream matching the receiver location. In lieu of including additional location hardware and software in the receiver 102, the system uses nearby devices that are already location-enabled, contacting the location-enabled device 104 using short-range communication, and receiving location information from the nearby location-enabled device 104. Since the location-enabled device 104 is contacted using short-range communication, the receiver 102 must also be at approximately the same location as the location-enabled device 104. This is an advantageous system for determining location as it requires only a simpler short-range communication system in the receiver 102 in lieu of a more complex location system such as GPS.

Once the receiver 102 receives the location from the location-enabled device 104, the receiver 102 determines the correct location specific advertisement stream to be presented. In other embodiments, other location-specific broadcast data is used in combination with the location data to determine other actions by the receiver 102, for example, determining whether a broadcast sporting event is to be blacked out.

Figure 2:
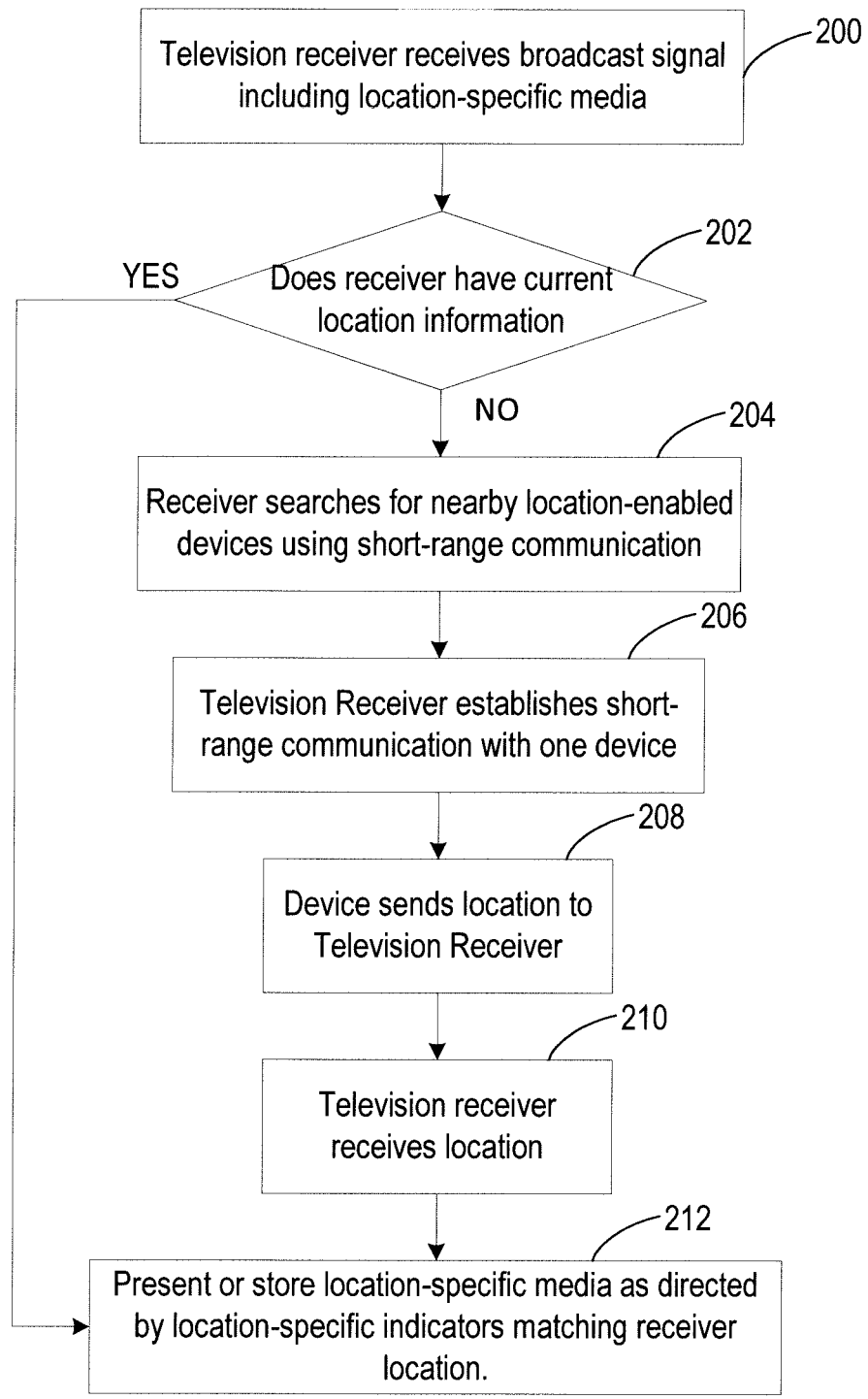
FIG. 2 is a flowchart of a method for presenting location-specific broadcast media.

Referring next to FIG. 2, a flowchart of a method for presenting location-specific broadcast media is shown. Shown are a receive broadcast signal step 200, a current location information decision point 202, a search for location-enabled devices step 204, an establish short-range communication step 206, a device sends location to receiver step 208, a receiver receives location step 210, and a present/store location-specific media step 212.

In the first receive broadcast signal step 200, the receiver 102 receives the broadcast signal 108 via the tuner front-end 110. The broadcast signal 108 includes location-specific media and/or data. The broadcast signal 108 may also include at least one location-specific indicator indicating which media is selected for the specific location or locations. Alternately, the at least one location-specific indicator may be broadcast ahead of time and stored by the receiver location application 116. The method then proceeds to the current location information decision point 202.

In the current location information decision point 202, the receiver location application 116 determines if the receiver 102 has location information (for example, if location had been determined for a previous broadcast), and whether the location information is current. For example, the system may be set for the location to be outdated (i.e. not current) after a certain amount of time has passed since last determining the receiver location. In one example, the location is outdated after one week, although it will be understood that a longer or shorter time period may be set. In that example, if the receiver 102 determines that the location is more than one week old, the location is not current. If the receiver 102 has current location information, the method proceeds to the last present/store location-specific media step 212. If the receiver 102 either does not have location information, or the location information is not current, the method proceeds to the search for location-enabled devices step 204. In another embodiment, the location information is triggered by an event. In one example, the location information is updated in response to the receiver 102 detecting that the broadcast channels have changed.

If the receiver 102 needs to determine the location, in the search for location-enabled devices step 204, the receiver location application 116 directs the receiver short-range communication module 118 to establish short-range communication with at least one nearby location-enabled device 104. If more than one location-enabled device 104 is available for communication, in one embodiment the receiver location application 116 selects one location-enabled device 104 for communication. In another embodiment, if more than one location-enabled device 104 is available the receiver location application 116 attempts to determine the closest location-enabled device 104 or devices, for example, using the acoustic ping method as described below in FIG. 3. The method then proceeds to the establish short-range communication step 206.

During the establish short-range communication step 206, the receiver short-range communication module 118 and the selected device short-range communication module 138 establish a communicative coupling. As previously described, the short-range communication may be Bluetooth, NFC, wireless, or any other suitable form of short-range communication between devices 104. Next, in the device sends location to receiver step 208, the device location is sent from the location-enabled device 104 to the receiver 102 via the short-range communication. In the embodiment shown, the device location is sent via the device location application 130 as obtained from the location module 132 of the location-enabled device 104.

In the following receiver receives location step 210, the receiver short-range communication module 118 receives the location data (information) from the location-enabled device 104, and sends the location information to the receiver location application 116.

In the present/store location-specific media step 212, the receiver location application 116 uses the location information to direct the tuner front-end 110 to present a currently-broadcasting location-specific stream matching the current location, store location-specific media for later use (on the optional storage 120), or display location-specific media that had been previously stored on the storage 120.

Referring again to FIG. 2, the method for presenting location-specific broadcast media enables the receiver 102 to present location-specific media, such as advertisements, without the broadcaster knowing the location of the receiver 102 or including components in the receiver 102 to directly determine the location of the receiver 102.

Advantageously, the method for presenting location-specific broadcast media uses the one or more nearby location-enabled devices 104 to determine the location of the receiver 102. Smartphones, tablets and other devices including short-range communication and that are location-enabled (i.e. configured to determine their approximate geographical location) are common in the art and are commonly found in residences. Using the nearby location-enabled devices 104 reduces the requirements of the receiver 102 while still providing for the location-specific media.

Figure 3:
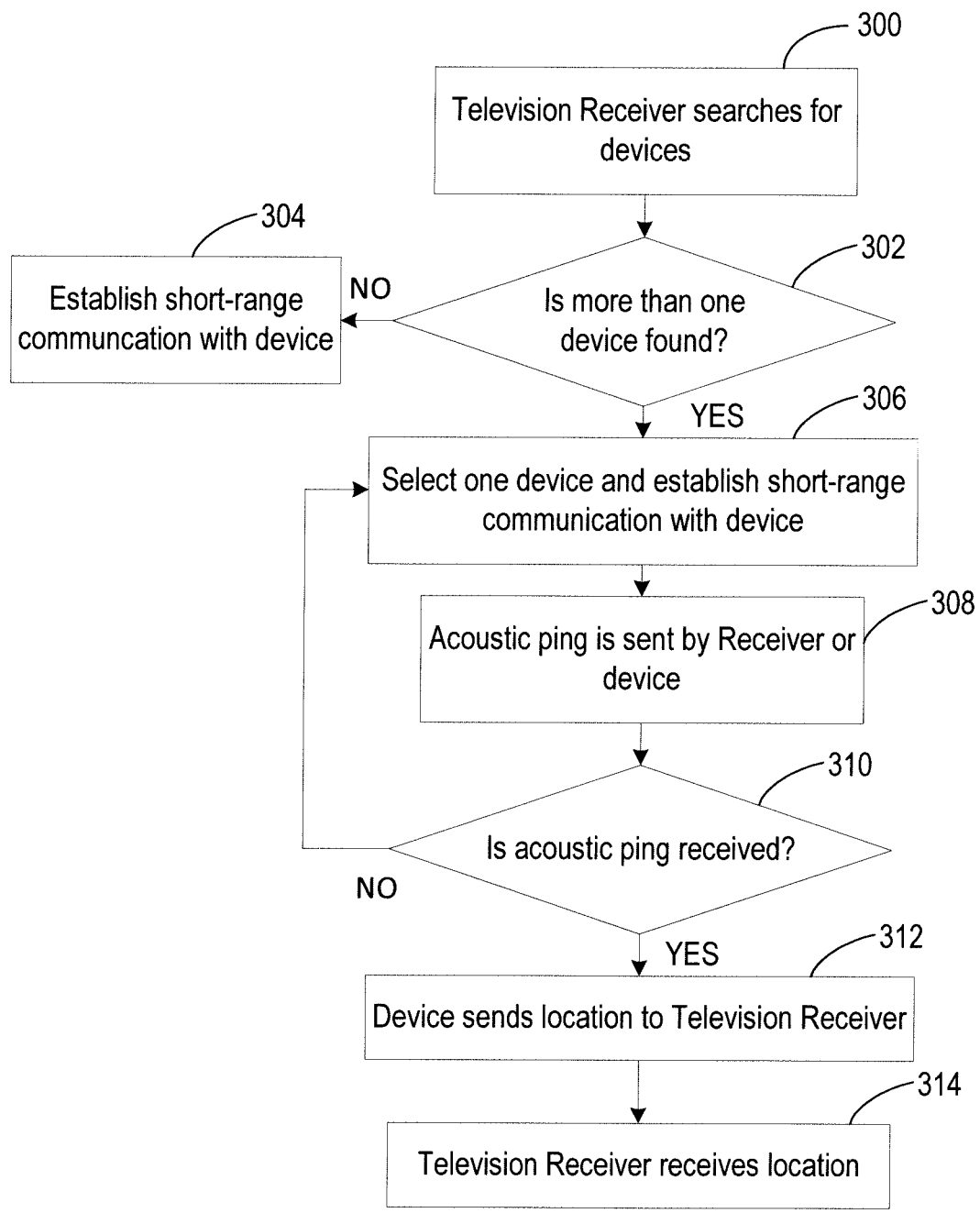
FIG. 3 is a flowchart of a method for selection of a nearby device.

Referring next to FIG. 3, a flowchart of a method for selection of a nearby location-enabled device 104 is shown. Shown are a first nearby device search step 300, a next found devices decision point 302, a select device step 304, an establish short-range communication step 306, a send ping step 308, an acoustic ping received decision point 310, a send location step 312, and a receive location step 314.

In the first nearby device search step 300, the receiver 102 searches for location-enabled devices 104 via the receiver short-range communication module 118. One or more short-range communication methods may be used. It is assumed for this method that there is at least one location-enabled device 104 available for short-range communication with the receiver 102. If any of the at least one location-enabled devices 104 do not have an associated location, the receiver 102 may be configured to prompt the user to manually enter a location for the device 104, may exclude the device 104, or prompt the user whether to exclude the device 104.

In the next found devices decision point 302, if the receiver short-range communication module 118 finds a plurality of location-enabled devices 104, the method proceeds to the select device step 304. If only one location-enabled device 104 is found, the process proceeds to the establish short-range communication step 306 with the single location-enabled device 104 available, and the connection between the broadcast receiver 102 and the single location-enabled device 104 is established.

During the select device step 304, the receiver 102 selects one location-enabled device 104 from the plurality of nearby location-enabled devices 104 found. In one embodiment, the receiver is configured to prioritize the nearby location-enabled devices and attempt communication in order of priority. For example, as cell phones have reliable location information due to "9-1-1" regulations, the receiver 102 can be configured to prioritize nearby location-enabled devices 104 that are cell phones. The receiver short-range communication module 118 then establishes a short-range communicative connection with the device short-range communication module 138 of the selected location-enabled device 104. The method then proceeds to the send ping step 308.

In the send ping step 308, either the receiver 102 or the location-enabled device 104 emits an acoustic ping (i.e. a sound) via the sound emitter of that component. The sound is of an approximate loudness that it will be recognized by the receiving component (i.e. the location-enabled device 104 when the receiver 102 emits the sound and the receiver 102 when the location-enabled device 104 emits the sound) when the receiver 102 and the location-enabled device 104 are in the same room or in nearby rooms. In one embodiment the acoustic ping is a "chirp" (a frequency sweep burst). In another embodiment the ping is a pseudo-noise sequence with an initial loudness reduced over time. In Therefore, in one embodiment the receiver 102 is configured to emit sound and the location-enabled devices 104 includes the device microphone 134, the receiver 102 emits the acoustic ping, and the location-enabled device 104 "hears" the ping via the device microphone 134 and as a result the receiver 102 receives an indication from the device 104 indicating that the ping was "heard" by the location-enabled device 104. In the other embodiment, the location-enabled device 104 is configured to emit sound and the receiver 102 includes the receiver microphone 122, the location-enabled device 104 emits the acoustic ping, and the receiver 102 "hears" the acoustic ping. Which component (the device or the receiver 102) is the sound emitting component and which component is the receiving component is determined either randomly or dependent on availability of the sound emitter 124, 136 and the microphone 122, 134 for each component.

In the next acoustic ping received decision point 310, the receiving component "listens" for the acoustic ping via the microphone 122, 134. If the receiving component "hears" the acoustic ping, the method proceeds to the send location step 312. If the receiving component does not "hear" the acoustic ping, the method returns to the establish short-range communication step 306 and the receiver 102 establishes short range communication with a different one of the location-enabled devices 104 and the process repeats until the acoustic ping is heard.

If the receiving component "hears" the acoustic ping, the method proceeds to the send location step 312. In the send location step 312, the location-enabled 104 sends the device location to the receiver 102.

In the final receive location step 314, the receiver 102 receives the location of the location-enabled device 104.

Figure 4:
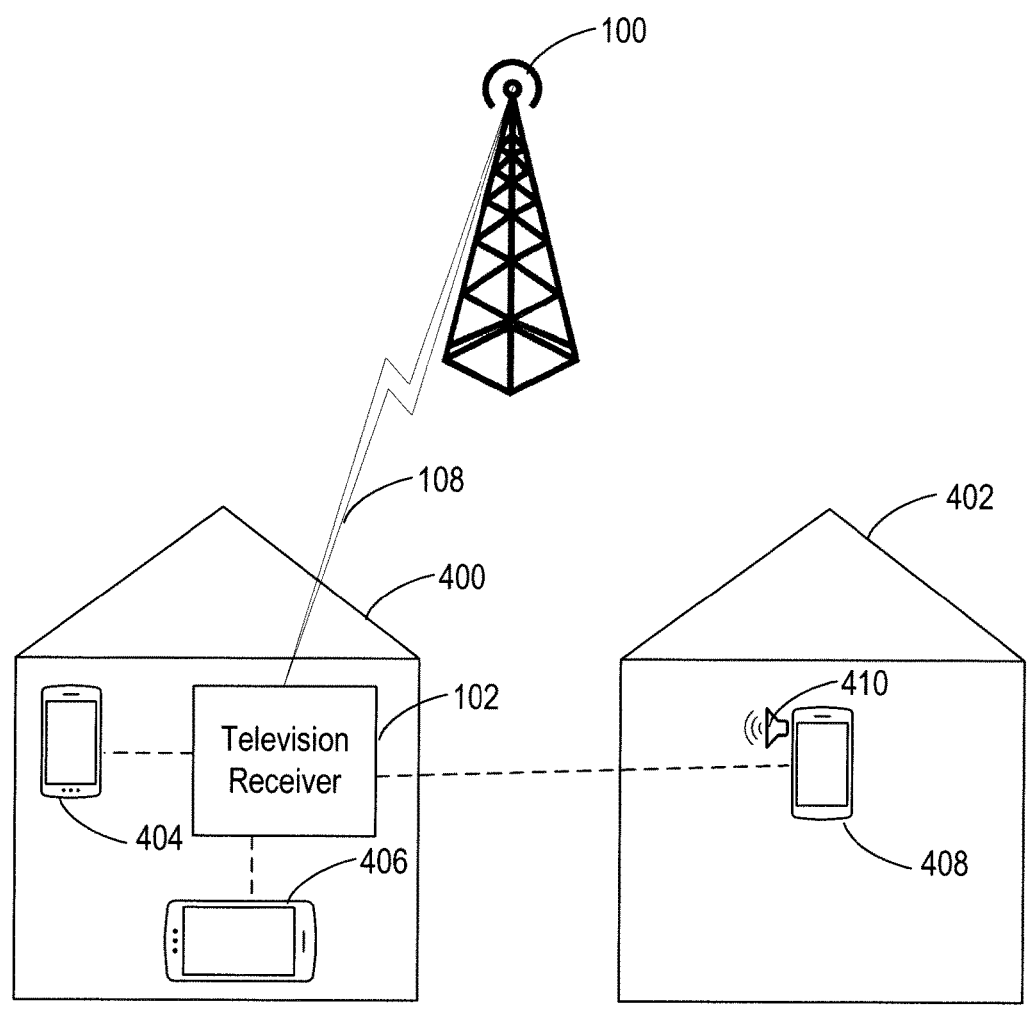
FIG. 4 is a first schematic diagram of an exemplary system during the method of FIG. 3.
Figure 5:
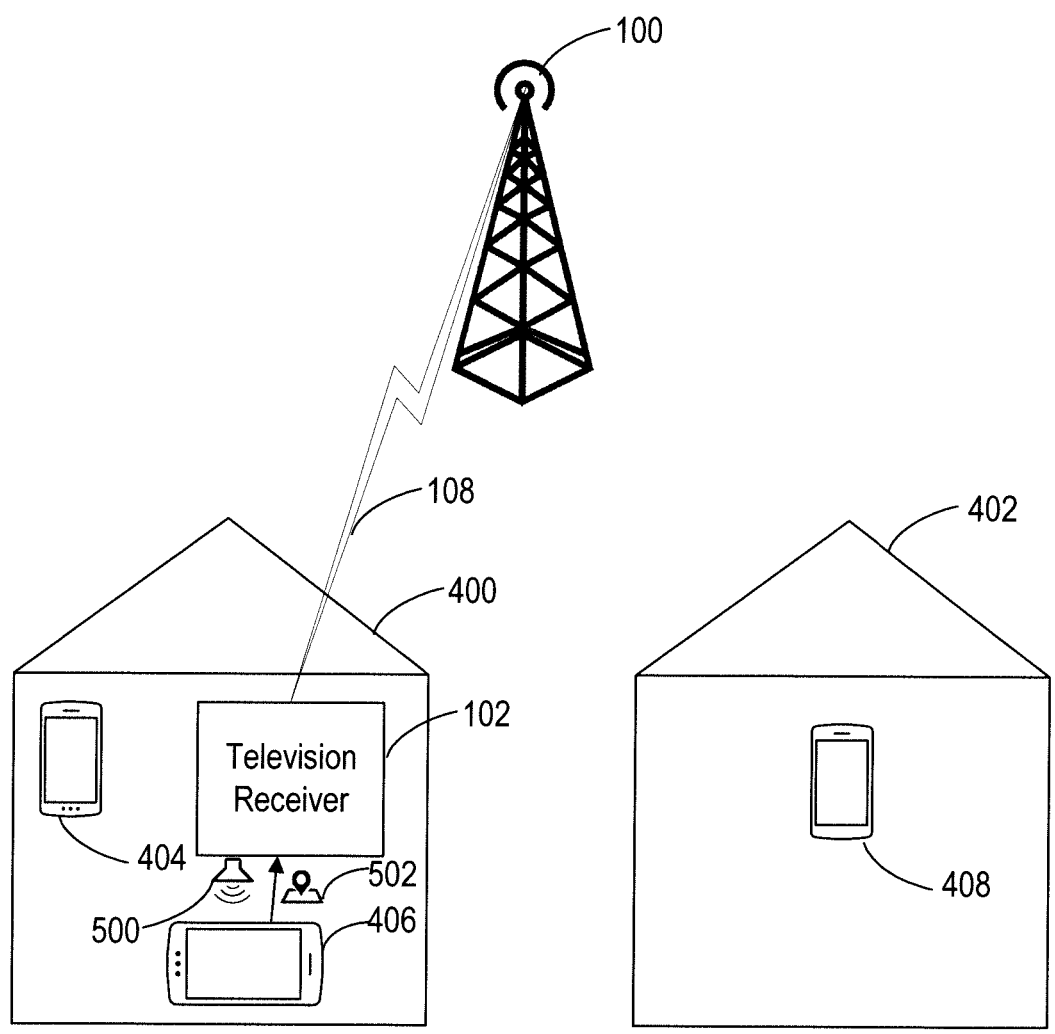
FIG. 5 is a second schematic diagram of the exemplary system during the method of FIG. 3.

Referring next to FIGS. 4 and 5, schematic diagrams of an exemplary system using the method of FIG. 3 is used is shown. Shown are the digital broadcast source 100, the digital broadcast receiver 102, the digital broadcast signal 108, a first residence 400, a second residence 402, a first location-enabled device 404, a second location-enabled device 406, a third location-enabled device 408, a first acoustic ping 410, a second acoustic ping 500, and location data 502.

In the exemplary system of FIGS. 4 and 5, two nearby residences are shown, the first residence 400 and the second residence 402. It will be understood that instead of in a residence the receiver 102 may be located in any location that is likely to have at least one location-enabled device 104 nearby. The first residence 400 includes the receiver 102, the first location-enabled device 404 and the second location-enabled device 406. The receiver 102 receives the digital broadcast signal 108 from the digital broadcast source 100. The second residence 402 includes the third location-enabled device 408.

In the nearby device search step 300, as shown in FIG. 4 the receiver 102 searches for nearby location-enabled devices. In the example of FIGS. 4 and 5, three location-enabled devices are found via short-range communication: the first location-enabled device 404, the second location-enabled device 406 and the third location-enabled device 408. It should be noted that additional location-enabled devices may be present but do not include short-range communication or may be set to not be found, and therefore are not "found" by the receiver 102.

In the next found devices decision point 302 as shown in FIG. 4, the receiver 102 has found the plurality of location-enabled devices 404, 406, 408 (as indicated by the dashed lines), thus the method proceeds to the select device step 304. In this example, the receiver 102 selects the third location-enabled device 408. Then, either the receiver 102 or the third location-enabled device 408 sends the acoustic ping in the send ping step 308. In the example shown, the third location-enabled device 408 sends the first acoustic ping 410 as shown in FIG. 4.

In the example shown in FIGS. 4 and 5, the receiver 102 is in a different residence from the third location-enabled device 408 and does not hear the first acoustic ping 410 from the third location-enabled device 408 in the acoustic ping received decision point 310. Therefore, the method returns to the establish short-range communication step 306.

In the second iteration of the method, as shown in FIG. 5, the receiver 102 sends the second acoustic ping 500. The second acoustic ping 500 is "heard" by the second location-enabled device 406 in the acoustic ping received decision point 310. The process then proceeds to the send location step 312, and the second location-enabled device 406 sends the location data 502 to the receiver 102, whereby the device location is received by the receiver 102 in the receive location step 314.

Referring again to FIGS. 3-5, the device selection method using the acoustic ping is advantageous when multiple location-enabled devices are nearby to the receiver 102. The acoustic ping method is used to verify that the selected location-enabled device is close enough that one of the receiver-device pair can "hear" a sound sent by the matching component. In this way, if one location-enabled device is too far from the receiver 102 for the sound to be heard by the matching component, that location-enabled device can be rejected in favor of a closer location-enabled device where the sound is heard. In one embodiment a propagation time for the sound is measured for each location-enabled device 104 and the propagation time is used to determine the closest location-enabled device. In another embodiment all location-enabled devices 104 within range are tested using the acoustic ping, and a closest location-enabled device is determined based on a loudness of each received sound or other suitable comparison.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A digital broadcast receiver comprising:
   a tuner front-end configured to receive multi-stream digital broadcasting channels;
   a processor;
   a non-transitory memory coupled to the processor;
   a short-range communication module configured to perform short-range communication; and
   a receiver location application configured to run on the processor and communicatively coupled with the short-range communication module, the digital broadcast receiver configured to perform the steps of:
      finding, via the short-range communication module, a plurality of location-enabled devices within range of the short-range communication;
      selecting one of the plurality of location-enabled devices within range of the short-range communication;
      establishing short-range communication with the selected location-enabled device;
      receiving geographical location data from the selected location-enabled device, whereby the location data is used by the digital broadcast receiver as a location of the digital broadcast receiver; and
      selecting, by the digital broadcast receiver, based on the location of the digital broadcast receiver, of one digital stream from one received multi-stream digital broadcasting channel.

2. The digital broadcast receiver of claim 1 wherein the tuner front-end is configured to receive broadcasts including non-media data.

3. The digital broadcast receiver of claim 1 wherein the tuner front-end is configured to receive broadcasts compliant with ATSC 3.0.

4. The digital broadcast receiver of claim 1 wherein the received multi-stream digital broadcasting channel includes at least one location-specific stream.

5. The digital broadcast receiver of claim 4 wherein the selecting of one digital stream includes selecting at least one of the at least one location-specific stream based on the location of the digital broadcast receiver.

6. The digital broadcast receiver of claim 1 wherein the short-range communication is one of NFC, wireless, and Bluetooth communication.

7. The digital broadcast receiver of claim 1 further comprising a storage configured to store broadcasting received by the digital broadcast receiver.

8. The digital broadcast receiver of claim 1 wherein the digital broadcast receiver is configured to emit an acoustic ping, and the selecting of one of the plurality of location-enabled devices further comprises:
   making a preliminary selection of a preliminary device from the plurality of location-enabled devices;
   emitting, by the receiver, of an acoustic ping;
   receiving, by the receiver, of an indication from the preliminary device indicating that the preliminary device heard the acoustic ping, whereby the preliminary device is the selected location-enabled device.

9. The digital broadcast receiver of claim 1 wherein the digital broadcast receiver includes a microphone, and the selecting of one of the plurality of location-enabled devices further comprises:
   making a preliminary selection of a preliminary device from the plurality of location-enabled devices;
   listening, by the receiver, via the microphone for an acoustic ping;
   receiving the acoustic ping by the digital broadcast receiver; and
   in response to receiving the acoustic ping, selecting of the preliminary device as the selected location-enabled device.

10. A method for selecting of a digital broadcast stream by a digital broadcast receiver configured to receive and process multi-stream digital broadcast channels and configured for short-range communication, comprising the steps of:

finding a plurality of location-enabled devices within range of the short-range communication;

selecting one of the location-enabled devices found within range of the short-range communication;

establishing short-range communication with the selected location-enabled device;

receiving geographical location data from the selected location-enabled device, whereby the location data is used by the digital broadcast receiver as a location of the digital broadcast receiver; and selecting, by the digital broadcast receiver, based on the location of the digital broadcast receiver, of one digital stream from one received multi-stream digital broadcast channel.

11. The method for selecting of the digital broadcast stream by the digital broadcast receiver of claim 10 wherein the digital broadcast receiver is configured to receive broadcasts compliant with a ATSC 3.0.

12. The method for selecting of the digital broadcast stream by the digital broadcast receiver of claim 10 wherein the received multi-stream digital broadcasting channel includes at least one location-specific stream.

13. The method for selecting of the digital broadcast stream by the digital broadcast receiver of claim 12 wherein the step of selecting one digital stream includes selecting by the digital broadcast receiver of at least one of the at least one location-specific stream based on the location of the digital broadcast receiver.

14. The method for selecting of the digital broadcast stream by the digital broadcast receiver of claim 10 wherein the short-range communication is one of NFC, wireless, and Bluetooth communication.

15. The method for selecting of the digital broadcast stream by the digital broadcast receiver of claim 10, the digital broadcast receiver further comprising a storage configured to store broadcasting received by the digital broadcast receiver, and further comprising the step of storing at least a portion of the selected digital stream on the storage.

16. The method for selecting of the digital broadcast stream by the digital broadcast receiver of claim 10 wherein the digital broadcast receiver is configured to emit an acoustic ping, and the selecting of the at least one of the location-enabled devices comprises:

making a preliminary selection of a preliminary device from the plurality of location-enabled devices;

emitting, by the receiver, of an acoustic ping; and receiving, by the receiver, of an indication from the preliminary device indicating that the preliminary device heard the acoustic ping, whereby the preliminary device is the selected location-enabled device.

17. The method for selecting of the digital broadcast stream by the digital broadcast receiver of claim 10 wherein the digital broadcast receiver includes a microphone, and the selecting of one of the location-enabled devices comprises:

making a preliminary selection of a preliminary device from the plurality of location-enabled devices;

emitting, by the preliminary device, of an acoustic ping; and receiving of the acoustic ping by the digital broadcast receiver, whereby the preliminary device is the selected location-enabled device.

* * * * *

UNITED STATES PATENT AND TRADEMARK OFFICE
CERTIFICATE OF CORRECTION

PATENT NO. : 9,948,982 B2
APPLICATION NO. : 15/202197
DATED : April 17, 2018
INVENTOR(S) : Shintani It is certified that error appears in the above-identified patent and that said Letters Patent is hereby corrected as shown below:

In the Claims

Claim 16, Column 12, Line 14, before "one" delete "the at least".

Signed and Sealed this
Twenty-ninth Day of May, 2018

Andrei Iancu
*Director of the United States Patent and Trademark Office*